Oct. 13, 1964     T. C. WALDROP     3,152,809
MOLDED CUP

Filed April 24, 1961

INVENTOR.
TOM C. WALDROP
BY
Alexander E. Dowell
ATTORNEYS.

United States Patent Office 3,152,809
Patented Oct. 13, 1964

3,152,809
IMPROVED MOLDED CUP
Tom C. Waldrop, Arlington, Tex., assignor to Empire Rubber Company, Grapevine, Tex., a corporation of Texas
Filed Apr. 24, 1961, Ser. No. 105,174
10 Claims. (Cl. 277—212)

This invention relates to improvements in swab cup structures and has particular utility when used in connection with swab cups which are designed to seal tightly against their supporting mandrels to prevent leakage between the cup and the mandrel when lifting a heavy column of fluid.

The present invention relates generally to the type of swab cup which surrounds and is supported upon a mandrel above a transverse shoulder thereof and which shifts axially on the mandrel with respect to said shoulder to provide a valving action which permits bypassing of the well fluids when the mandrel is descending and lifting of the fluid column when the mandrel is ascending, the cup having a rubber base providing a closure means which seats tightly on and seals against the upper surface of the mandrel shoulder when the cup is forced downwardly thereagainst while lifting said column of well fluids. Most of these swab cups also include annularly spaced metal reinforcements each lying in a plane including the axis of the cup and these reinforcements being embedded in the periphery of the cup with their lower ends terminating just short of the bottom zone thereof, the reinforcements being pivotally supported by an annular retaining means which is also embedded in the rubber. Referring to the rubber located within the base zone of the cup between the lower periphery thereof and the metal reinforcement and retaining means, in this zone there are alternately disposed thicker and thinner rubber portions as measured axially of the cup, the thinner portions lying in sectors between the bottom transverse surface of the cup and the lower ends of said reinforcements, and the thicker rubber portions being located in sectors of the base zone lying annularly between said reinforcements and below the retaining means.

When a rubber product of this type is molded and cured, it is well known that the rubber shrinks and that the amount of shrinkage in a particular direction is directly proportional to the thickness of the rubber in that direction and amounts to a certain percentage of the dimension. In other words, the rubber shrinks a certain number of thousandths of an inch per inch of thickness.

The applicant has found that when a cup is molded with said metal reinforcements extending into the base zone thereof and creating alternately thicker and thinner rubber portions in that zone, the shrinkage which takes place as a result of curing of the rubber creates undulations around the base surface of the cup, which undulations mirror the pattern of the metallic members embedded in the rubber. In other words, a greater amount of shrinkage takes place in the thicker portions of the rubber between the metal reinforcements, and a lesser amount of shrinkage takes place in the thinner portions located between the base of the cup and the lower ends of the reinforcements. These undulations resemble scallops and are undesirable because of the fact that they leave in the bottom surface of the cup an undulating pattern which does not lend itself to perfect seating on the shoulder of the mandrel which supports the cup. In the particular type of cup to which the invention relates, it is assumed that a completely smooth seating surface is desired at the bottom of the cup.

In the past various expedients for curing this scallop effect have been resorted to, the usual way being to make the rubber base zone axially thicker than is desired, and then to abrade or machine away part of the rubber after the rubber has been fully cured and has stabilized dimensionally. However, this approach unnecessarily increases the number of steps which must be performed during manufacture of the cups, and thereby increases the expense involved. In view of the highly competitive pricing of swab cups supplied by different manufacturers, this increase in expense is not tolerable if it can be avoided.

It is a primary object of this invention to provide improved cup structures which are effective to prevent such undulating or scalloping effects from occurring, such prevention being derived by eliminating the differences in thickness of the rubber base zone in the sectors thereof beneath the metal members. In other words, if metal means are provided which make the thicknesses between the bottom of the cup and the metal members substantially the same in all sectors, there will be no uneven shrinkage of the rubber and therefore no scalloping at the bottom of the cup.

Another important object of the invention is to improve the cup structure in such a way that the problem of scalloping at the base sealing zone is eliminated without significantly increasing the cost of materials or the labor involved in manufacture of the cups.

Other objects and advantages of this invention will become apparent from the following discussion of the drawings, wherein.

Figure 1:
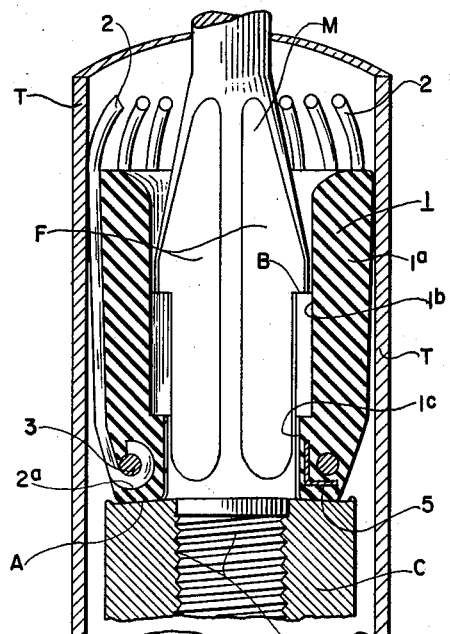
FIG. 1 is a sectional view through a length of tubing and showing a swab mandrel supporting a swab cup of improved structure according to this invention.

Referring now to the drawing, FIG. 1 shows a length of tubing T and a mandrel M extending therethrough, the mandrel being broken at a screw thread section S and joined with the upper end of the next lower mandrel, this upper end including a coupling C having a shoulder A at its upper end on which a swab cup 1 rests and seals. This swab cup 1 is of a type generally known in the prior art and includes a resilient body portion 1a made of rubber or other similar material, this body portion having a larger upper bore 1b and a smaller lower bore 1c, both of which bores receive the mandrel M. The upper and lower bores of the cup provide a step in the bore of the cup which abuts a stop B on the fluted section F of the mandrel to limit the upward motion of the cup with respect to the mandrel when the mandrel is descending in the tubing. This structure provides a well-known valving action by which the rubber cup is sealed at its bottom end on the shoulder A of the coupling C when the mandrel is rising, and by which the cup can slide upwardly to the stop B on the mandrel to permit bypassing of the well fluids upwardly past the cup and through the fluted section F of the mandrel. These structures and functions are well known in the prior art and are not, per se, considered inventive.

Figure 2:
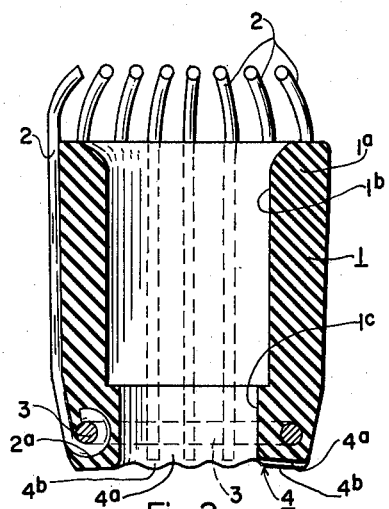
FIG. 2 is a sectional view through a known type of swab cup and illustrating to an exaggerated degree the scalloping tendency at the bottom of the cup.

The swab cup also includes a plurality of reinforcement elements, comprising wires 2 in FIG. 1, embedded in the outer periphery of the cup and having at their lower ends 2a openings which receive a retaining ring 3 which is also embedded in the rubber. Referring to FIG. 2, wherein like parts are given similar reference characters, the general structure and placement of the metal reinforcement and retaining parts can be more clearly seen.

The base zone of the cup referred to above in this specification comprises the rubber zone located between the bottom sealing surface of the cup and the metal reinforcements, and by reference to FIG. 2 it can be seen that this zone terminates at its lower surface in a series of undulations or scallops 4, which scallops reflect the shape of the metal reinforcements embedded thereabove in the cup. The base zone includes thicker rubber sectors, for instance in the vicinity of the reference character 4a and lying between the ring 3 and the bottom of the cup; and thinner rubber portions 4b lying in sectors between the bottom of the cup and the lower ends 2a of the metal reinforcement wires 2. As pointed out above, if the mold in which the cup is molded has a smooth annular bottom surface intended to form a smooth bottom 4 on the cup, when the rubber is cured, the rubber in the sectors 4a will shrink more than the rubber in the sectors 4b because it is thicker and therefore shrinks more thousandths of an inch than the thinner rubber. This accounts for the undesirable scallops which form around the base of the cup as illustrated in FIG. 2.

Figure 6:
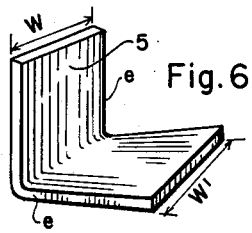
FIG. 6 is an enlarged perspective view of one of the metal inserts employed in the embodiment of the invention shown in FIG. 1.

The applicant's invention is intended to provide a cup structure which does not scallop at its lower end when the rubber is cured, and the applicant shows two different embodiments each designed to accomplish this purpose. FIGS. 1 and 6 show a first form of the invention, and FIGS. 3, 4 and 5 show a second form of the invention.

Referring now to the first form shown in FIGS. 1 and 6, a plurality of L-shaped metal insert members are added either between or below the lower ends 2a of the reinforcing wires so as to mask the contour of the metal reinforcement and retaining means and make this contour appear to be substantially smooth all the way around the base zone of the cup. If these L-shaped members 5 are located below the lower ends 2a of the reinforcement wires then the L-shaped members should be substantially abutting. On the other hand, if they are located between the lower ends of the wires 2a and directly below the retaining ring 3, they should terminate close to the sides of the reinforcing wires 2. In any event, however, it is only necessary that the space 4a, in FIG. 2, be filled in with metal or be masked so that the shrinkage between the lower metal surface in the bottom of the cup is relatively uniform all the way around the bottom zone. The portion of the L-shaped inserts which extends upwardly parallel with the bars 1c of the cup serves to anchor the insert and discourage any tendency which it may have to shift its position longitudinally of the cup. It may also be advantageous to make the L-shaped inserts 5 wedge-shaped so that the width dimension W is smaller than the width dimension W', FIG. 6, so that the side edges of the L-shaped inserts will lie upon radials extending from the axis of the cup. In other words, the composite surface provided by a plurality of these inserts 5 is substantially plane and annularly continuous.

Figure 3:
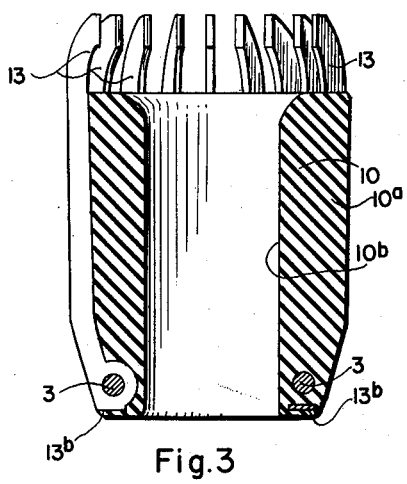
FIG. 3 is a sectional view through a modified form of swab cup embodying the present invention.
Figure 4:
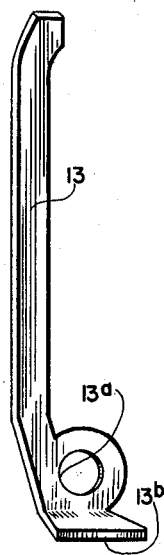
FIG. 4 is a perspective view showing one of the metal reinforcements employed in the embodiment of the invention according to FIG. 3.
Figure 5:
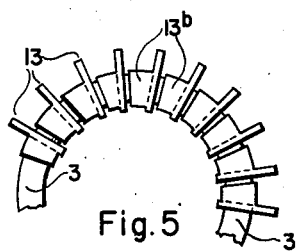
FIG. 5 is a partial bottom view looking upwardly at the metal reinforcements and retaining means employed in the embodiment of the invention shown in FIG. 3.

Referring now to FIGS. 3, 4 and 5, these figures show a somewhat different type of swab cup 10 which comprises a rubber body 10a having a bore 10b which may or may not be stepped as shown in FIGS. 1 and 2, and this type of cup including reinforcement 13 comprising sheet metal stampings as distinguished from bent wires. The shape of each stamping 13 is shown in FIG. 4 wherein it will be seen that the stampings are provided with holes 13a through which the annular retaining ring 3 is passed for pivotally retaining these stampings in place on the rubber body 10a. At the bottom of each stamping 13 is a small metal plate comprising a tab 13b which extends transversely of the plane of the stamping 13 in the direction of the next adjacent stamping. In the bottom view of FIG. 5, the composite effect provided by the tabs 13b extending toward the next adjacent stampings 13 is clearly shown. The outer end of each tab 13b is cut off along a radial line extending from the axis of the cup so that the stampings 13 provide a relatively continuous flat surface at their lower ends and this surface lies substantially parallel with the bottom cup-sealing surface of the rubber zone located therebelow. In this way, spaced and mutually separated reinforcements 13 are provided up the outer periphery of the cup, but their lower ends at the tabs 13b present substantially a continuous composite surface designed to promote uniform longitudinal shrinkage in all sectors around the base zone of the cup.

The present invention is not to be limited to the exact form shown in the drawings, for obviously changes may be made therein within the scope of the following claims.

I claim:

1. In a swab cup having an annular body of resilient material tending to shrink due to heat treating and having an annular series of circumferentially spaced metal reinforcement elements each disposed longitudinally of the cup and embedded therein and the bottom of the cup terminating in an annular base zone of resilient material, said elements extending downwardly and having lower ends located in said base zone of the body at a level immediately adjacent to the bottom of the cup, means for equalizing the shrinkage of said base-zone material in sectors disposed between said reinforcements as compared with the shrinkage in sectors including one of said elements, comprising metal plate means occupying the space between the lower ends of the reinforcement elements and having surfaces lying in a common plane normal to the axis of the cup and substantially at the same level as said lower ends.

2. In a cup as set forth in claim 1, said metal plate means each comprising a plate attached to the lower end of one of said reinforcement elements and extending substantially to the next adjacent element.

3. In a cup as set forth in claim 1, said cup having an axial bore therethrough defining a cylindrical-wall body and said reinforcement elements being embedded in said wall, and said metal plate means comprising an L-shaped metal insert having one leg lying in said common plane and the other leg extending partway up said wall parallel with the axis of said bore.

4. In a cup as set forth in claim 1, said surfaces of said metal plate means each being sector-shaped so as to substantially fit the space between adjacent reinforcement elements.

5. In a swab cup having an annular body of molded resilient material tending to shrink due to heat treating and the bottom of the cup terminating in an annular base zone of resilient material and the cup having an annular series of circumferentially spaced metal reinforcement elements each disposed longitudinally of the cup and embedded therein and pivotally engaging an annular retaining means near their lower ends embedded in said base zone of the body at a level immediately adjacent to and above the bottom of the cup, means for equalizing the shrinkage of said base-zone material in sectors beneath said elements as compared with the shrinkage in sectors between said elements where the retaining means is spaced above the bottom of the cup at a distance which is different from the distance of the lower ends of said elements from the bottom of the cup, comprising metal plate means each inserted in a sector where said distance is the greater and having a surface lying in a common plane normal to the axis of the cup and spaced from the bottom thereof substantially by the lesser of said distances.

6. In a cup as set forth in claim 5, said metal plate means each comprising a plate attached to the lower end of one of said reinforcement elements and extending substantially to the next adjacent element.

7. In a cup as set forth in claim 5, said cup having an axial bore therethrough defining a cylindrical-wall body and said reinforcement elements being embedded in said wall, and said metal plate means comprising an L-shaped metal insert having one leg lying in said common plane and the other leg extending partway up said wall parallel with the axis of said bore.

8. In a cup as set forth in claim 5, said surfaces of said metal plate means being sector-shaped so as to substantially fit the space between adjacent reinforcement elements.

9. In a cup as set forth in claim 5, said reinforcement elements each comprising a long metal element having an opening therethrough near its lower end; and said retaining means comprising an annular ring passed through said openings; and said metal plate means each comprising a metal tab attached to an element at its lower end and extending therefrom substantially to the next adjacent reinforcement element, said surfaces of said tabs forming a composite annular surface parallel to the bottom of the cup.

10. In a cup as set forth in claim 5, the cup being proportioned such that the difference between the greater and the lesser of said distances is at least half as great as said lesser distance.

References Cited in the file of this patent

UNITED STATES PATENTS

| | | |
|---|---|---|
| 2,352,812 | Taylor | July 4, 1944 |
| 2,466,572 | Bowerman et al. | Apr. 5, 1949 |
| 2,609,258 | Taylor et al. | Sept. 2, 1952 |
| 2,711,939 | Losey | June 28, 1955 |
| 2,723,721 | Corsette | Nov. 15, 1955 |
| 2,887,347 | Losey | May 19, 1959 |